United States Patent [19]

Monson

[11] Patent Number: 5,412,772
[45] Date of Patent: May 2, 1995

[54] SYSTEM FOR PERMITTING A VIEW OF AN OBJECT OR A USER INTERFACE TO BE EXCHANGED BETWEEN OPERATING SYSTEM ENVIRONMENTS

[75] Inventor: Lynn T. Monson, Orem, Utah
[73] Assignee: Novell, Inc., Orem, Utah
[21] Appl. No.: 960,005
[22] Filed: Oct. 13, 1992
[51] Int. Cl.6 .............................................. G06F 9/38
[52] U.S. Cl. .................................... 395/155; 395/161; 364/280
[58] Field of Search ............... 364/976.1, 976.2, 976.3, 364/978.2, 280; 395/155, 161, 700, 650

[56] References Cited

U.S. PATENT DOCUMENTS

| | | | |
|---|---|---|---|
| 4,530,052 | 7/1985 | King et al. | 395/650 |
| 4,665,501 | 5/1987 | Saldin et al. | 395/161 X |
| 4,747,040 | 5/1988 | Blanset et al. | 364/280 |
| 4,970,639 | 11/1990 | Diefendorf et al. | 364/978 X |
| 5,036,484 | 7/1991 | McCoy et al. | 364/977 X |
| 5,063,500 | 11/1991 | Shorter | 364/976 X |
| 5,134,580 | 7/1992 | Bertram et al. | 364/976 X |
| 5,136,709 | 8/1992 | Shirakabe et al. | 364/976 X |
| 5,179,703 | 1/1993 | Evans | 395/700 X |
| 5,278,973 | 1/1994 | O'Brien et al. | 364/280 X |

OTHER PUBLICATIONS

Choobineh, Joobin, Michael Mannino and Veronica Tseng, A Form-Based Approach for Database Analysis and Design, Communications of the ACM, vol. 35, No. 2 (Feb. 1992), p. 108 (published in U.S.A.).
Reference Guide for ObjectVision, Borland Corporation, 1991 (published in U.S.A.).
User's Guide for ObjectVision, Borland Corporation, 1991 (published in U.S.A.).
Manual for WordPerfect Office, Forms Maker, Version 3.0, 1990 (published in U.S.A.).
Microsoft Advanced Systems, IProperty Interface Documentation, Microsoft Corporation, 1992 (published in U.S.A.).
Microsoft Advanced systems, Messaging Client API, Microsoft Corporation, 1992 (published in U.S.A.).
Microsoft Advanced Systems, ITextStream Interface Documentation, Microsoft Corporation, 1992 (published in U.S.A.).
CCITT, The International Telegraph & Telephone Committee, Message Handling Systems: EDI Messaging System, Draft Recommendation X.435, Version 6.0, Nov. 30, 1990 (published in Geneva).
Microsoft Advanced Systems, IViewTable Interface Documentation, Microsoft Corporation, 1992 (published in U.S.A.).

Primary Examiner—Heather R. Herndon
Assistant Examiner—Cliff N. Vo
Attorney, Agent, or Firm—Weil, Gotshal & Manges

[57] ABSTRACT

A system for permitting the view of an object or of a user interface to an application to be exchanged between different operating system environments is based on a nested, tagged file format. A view driver for creating a view of an object is provided having a simple, familiar user interface. An object having a view so created will have associated with it a view data file representing the view. The view data file is comprised of elements identified by tags. Display of a view in an arbitrary operating system environment is facilitated by a common understanding of the tags, permitting processing of the view data file even if the file contains elements, identified by understood tags, which elements themselves are not understood. An extensible file format for exchange of views between operating system environments is provided.

5 Claims, 6 Drawing Sheets

SYSTEM FOR PERMITTING A VIEW OF AN OBJECT OR A USER INTERFACE TO BE EXCHANGED BETWEEN OPERATING SYSTEM ENVIRONMENTS

BACKGROUND

The present invention relates generally to a computer system of the type employing a windowing graphical user interface, and more specifically to a system allowing a user to create or modify a window, including its arrangement and contents, through which the user interacts with the computer system which is transportable between different operating system environments.

Modern personal computers ("PCs"), computer workstations, and in fact many electronic devices, run application software in a particular operating system environment ("OSE"). The application software is generally used to create, store or retrieve files which represent objects such as documents, mail notes, reminder items, etc. The application software has built into it a particular format for presenting the visual workspace in which the user inputs data, views data, and controls the various functions performed by the application. This is typically called a "user interface," and when the workspace consists of graphics elements, further referred to as a "graphical user interface." The user interface has a "view," which is the arrangement of items such as an address field, a control button, graphical information, etc. The view is usually presented to the user in a rectangular region of the screen called a "window." The data comprising the view is generally stored in a view file of record in a data base, and the data representing the object itself is generally stored in an object file or record in a data base. The view file and the data file are generally separable files.

In general, each application will have its own particular interface view (e.g., visual appearance, presentation style of particular data, order of elements, etc.) While the content of a view is often dictated by the application's requirements (e.g., one must specify at least the recipient of a mail note), the view or organization of the application's interface may be modified or customized to suit the user's particular needs.

Furthermore, the user interface typically varies from application to application. That is, a user typically has numerous applications on his PC, each having its own distinct interface. Certain applications are designed, however, to have similar user interfaces so that a user need remember or be familiar with only a single interface and its usage. This is most common in application "suites" in which several applications are packaged or bundled together, or where applications are specifically designed to operate in concert. Certain applications allow modification or customization of views permitting the user to arrange a view so as to be similar between different applications.

Often, a single application will be written in several versions to run in one of several OSEs. For example, the application software package Office 4.0 ™ from WordPerfect Corporation is written in a version for the DOS operating system (running Microsoft Windows ™), and a separate version for the Apple Macintosh ™ operating system. Each OSE has its own particular native file format, file handling protocols, etc., yet it is highly desirable to allow a file created by an application operating in one OSE to be utilized by the same application (or in fact a different application) operating in another OSE. Although a limited commonality has been provided across different OSEs for specific applications, for example viewing a record in a data base from either OS/2 or Windows provided by Object Vision from Borland, Inc., such has not been provided in the art in terms of a graphical user interface for general applications. That is, the ability to create an object having a view in the graphical user interface of a first OSE and display that object in the graphical user interface of a second OSE for general applications has not been provided.

Applications must often store data to, or retrieve data from a memory. This memory may be organized and accessible in the form of a data base, using auxiliary software to control data handling, and/or may be some other type of memory arrangement. Where both a data base and other type of memory arrangement are employed it may be necessary to present data from both the data base and other type of memory arrangement. The ability to customize a single view of data from these two different sources in a first OSE which is interpretable in a second OSE has not been provided to the user.

Many applications allow for transmission of objects from one electronic device to another. In certain applications such as electronic mail packages objects are routinely created specifically for viewing by a recipient. Although a fair amount of flexibility is provided for customizing the view of a created and/or received object within a single OSE, the ability to control how a recipient views an object created in a different OSE than that in which he is viewing the object has not been provided in the art. Specifically, when a message is received in a recipient's OSE the message is displayed according to the view definition in the recipient's OSE. This is true regardless of the view definition in which the message was created.

In many applications, allowing the transmission of objects between electronic devices (typically over a network) is overseen by a "system administrator," who is the person having control over the traffic on the network, and responsibility for its proper use and functioning. In certain circumstances a systems administrator, or like individual, may desire to control the view of objects exchanged over the network. For example, it may be desirable that all mail notes sent over the network carry the author's company's logo, a proprietary rights message, etc. Or it may be desirable that certain individuals be copied on all correspondence between two designated correspondents. However, the ability for a system administrator or other party to control the view of selected objects, for example in a networked environment, has not been provided in the art. This is especially true where there are citizens of the network operating in different OSEs.

In any instance where a user is provided with the ability to customize the view of an object or the user interface of an application, keeping the interface for view customization flexible while limiting the complexity of the view customizing tools and process is desirable. Furthermore, utilization of a known paradigm or metaphor for the view customization tools and processes facilitates an easy and rapid mastery of customization. Of the few tools and processes for controlling the view of an object or the user interface of an application known in the art which provide a degree of flexibility while minimizing complexity and capitalizing on known paradigms or metaphors, none have provided a sufficient and robust ability to define objects whose views are extensible across different OSEs.

Finally, each OSE will have a unique set of functionalities and number of features, some of which are not provided for by other OSEs. That is, a view may include a particular functionality or feature, for example a sound clip, which may not be interpretable in OSEs other than that in which the object was created. Typically, an object containing an unrecognizable element would prevent the recognition of the entire object, or worse. However, it is desirable to be able to exchange any object having a view definition between OSEs. The art has heretofore not provided a sufficient tool or process for allowing the exchange of files containing functionalities or features not provided for in each OSE exchanging the object.

SUMMARY OF THE INVENTION

The present invention provides a system for customizing the view of an object or a user interface which addresses the problems and inadequacies discussed above. The system is installed on a PC, a workstation or other electronic device having an operating system and one or more software applications running on the operating system of the type having a windowing-type graphical user interface. The system includes a special application called a view driver, which is used in conjunction with the one or more applications to control the view of an object or application. The view driver is not a stand alone application, but rather a framework used in conjunction with other applications.

Objects are displayed in windows (views) which show certain attributes and components of the object. Occasionally, the only user interface to an application will be an object, in which case the view of that object's window is the view of the user interface to the application itself.

According to one embodiment of the present invention, six types of views are provided. They are: Appointment Views, Folder Views, Mail Views, Note Views, Phone Views, and ToDo Views. The names of these views suggest their visual appearance and the metaphor they represent. Each view has a minimum set of attributes and components. The minimum set may be arranged and added to by a user to fit the users needs and preferences.

From the applications perspective, each application creates objects, and each object has properties. A number of the object's properties relate to the view of the window, or user interface, which represents the object. The application creating an object specifies the general parameters of its user interface, but does not specify the details of the view of the window itself. Rather, the view driver controls the definition of the view, subject to the general parameters defined by the application.

The view driver itself has a user interface for allowing a user to see (or otherwise perceive), input, and store data or instructions about an object. The view driver's user interface is a simple window having a number of graphical view items which the user may select and place arbitrarily in the window. The view items include address and text fields, control buttons, graphic images, etc., and may represent data in a data base and/or other memory device. A user may select and position a view item by a method known in the art (e.g., "clicking" on the item using a mouse, and "dragging" the item to the desired position in the window). The format of the view driver's interface may be arranged to provide one or more columns of boxes on one side of the window, each box containing an item which a user may select and position in the window, similar to that of known "paint" programs, for example.

Once a user has created a view for an object, the view is associated with the object such that each time the object is accessed (i.e., opened) that view will be presented to the user. Furthermore, the user may specify that the display of any object be in a particular view. This is true whether the object was created by the user or not, created with the selected display view or not, and further whether the object was created by an application in the same OSE or not.

The present invention also allows a system administrator to provide a set of standard views for objects. In this case, the view file is predefined, and resident in shared memory, such as in a data base. The user creates an object using the standard view, and sends the object to another user. The object does not carry with it a view file. Rather, in this case the object carries only an indication of the particular standard view it was created in. Using the indication of the view the object was created in, the recipient's system obtains the correct standard view from shared memory, and displays the object as desired.

Integral to the system for customizing the view of an object or a user interface for exchange between OSEs is the file format for views. This file format includes tags, header information, and specific control definitions enabling its interpretation by the view driver associated with a variety of OSEs. The file format includes an identification of objects predefined to be common to the various OSEs, and identification and specification of objects specific to one or more OSEs. The object specification may include sufficient details such that the information needed to interpret the objects specific to one OSE may be interpreted in other OSEs. The file format allows for a particular view to vary as between the different OSEs to accommodate differences between the environments while maintaining the general layout and functionality of the view.

The file format of the present invention is a nested file format, with tags associated with selected nested portions of the file (i.e., tagged objects, properties, and controls). According to the present invention, a nested tagged format is provided in which nested tagged portions of files are arranged in an inherent order to allow construction of a window based graphical user interface view. This facilitates accommodation of differences between OSEs while maintaining the general layout and functionality of the view.

Also, the view file format of the present invention is extensible without sacrificing exchangeability between OSEs. The tags allow identification of the object and its constituent controls, from which an application can process some or all of the view file. That is, a view file may be processed even though it contains information the processing application cannot interpret. Not only does such a file format reduce the risk of system errors, it allows information to be presented to a user about aspects of view which the application cannot fully interpret.

Thus, the present invention overcomes many of the problems relating to controlling the view of an object or the user interface of an application between different OSEs found in the prior art. However, a fuller understanding of the present invention, the manner in which it addresses the problems of the prior art, and additional advantages will be had by referring to the drawings, described briefly below, and from the detailed description and claims following.

BRIEF DESCRIPTION OF THE DRAWINGS

A detailed description of embodiments of the present invention will now be presented with regard to these figures in which like reference numerals will be used to denote like elements between the various figures.

DETAILED DESCRIPTION

Figure 1:
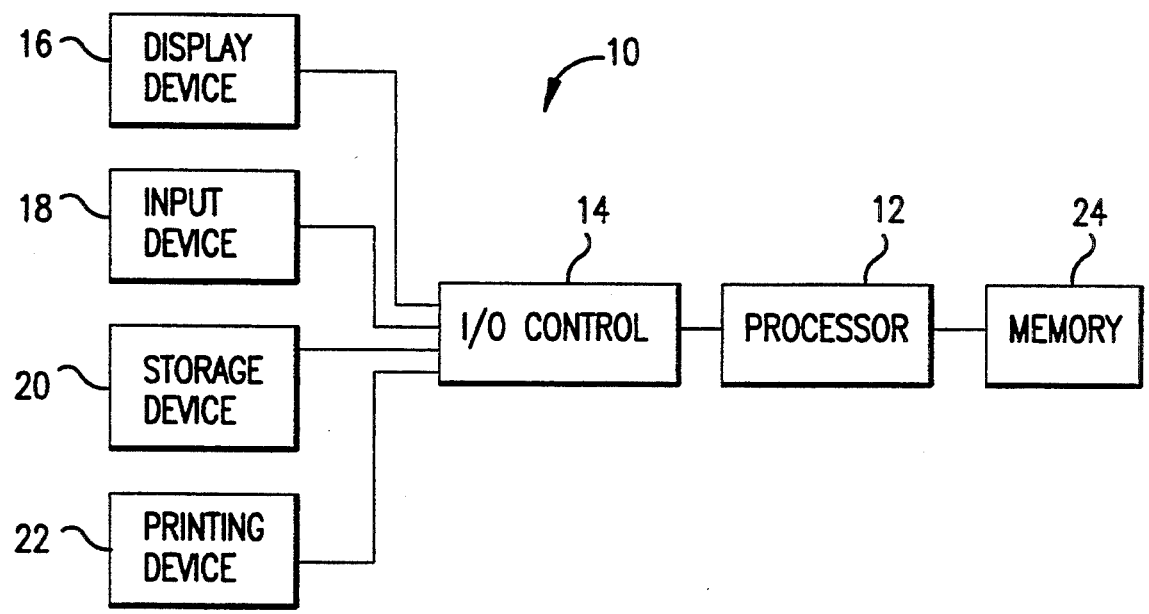
FIG. 1 is a schematic illustration of a hardware arrangement of a computer system within which the present invention may operate.
Figure 2:
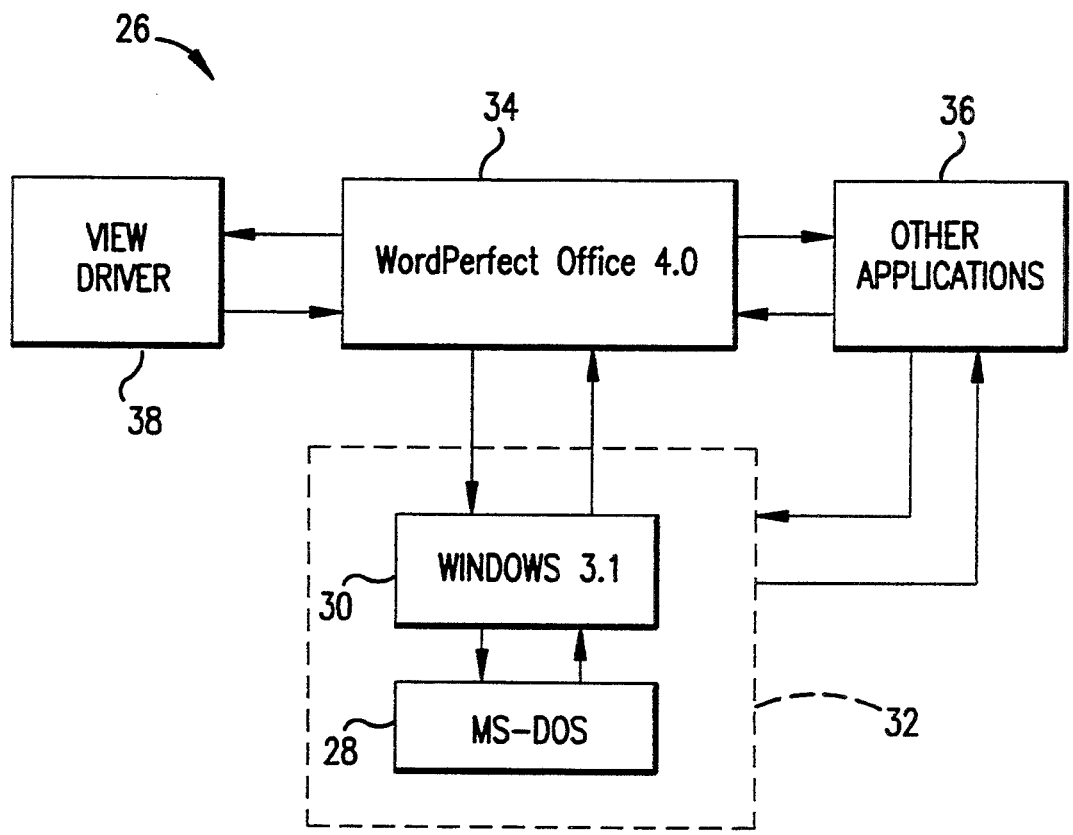
FIG. 2 shows a software configuration in which a platform specific operating system and an interface application form an OSE within which the present invention may operate.

With reference initially to FIGS. 1 and 2, schematically shown therein is the hardware and software arrangement of a computer system within which the present invention may operate. FIG. 1 shows a computer system 10 within which there is a processor 12 connected via I/O control 14 to a display device 16 such as a CRT, an input device 18 such as a keyboard and mouse combination, a storage device 20 such as a magnetic or optical disk drive, and a printing device 22. Also directly connected to processor 12 is a memory device 24 such as RAM. Processor device 12 will be, for example, a member of the Intel 8086/8088 family, such as an 80386 processor.

FIG. 2 shows a software configuration 26 in which a platform specific operating system 28, for example MS-DOS ™ from Microsoft Corporation, and an interface application 30, for example Windows 3.1 ™ from Microsoft Corporation form an operating system environment (OSE) 32. A specific software application 34, such as Office 4.0 ™ from WordPerfect Corporation operates "on top of" the OSE. Other applications 36 may also run on top of the OSE 32, and may also interact with the specific software application 34. View driver software 38 operates in conjunction with the specific software application 34 to control views of objects or user interfaces for the specific software application 34 as described in further detail below.

Although the following detailed description assumes that the hardware and software configurations are roughly as shown in FIGS. 1 and 2, many other possible arrangements are contemplated within the scope of the present invention.

Figure 3:
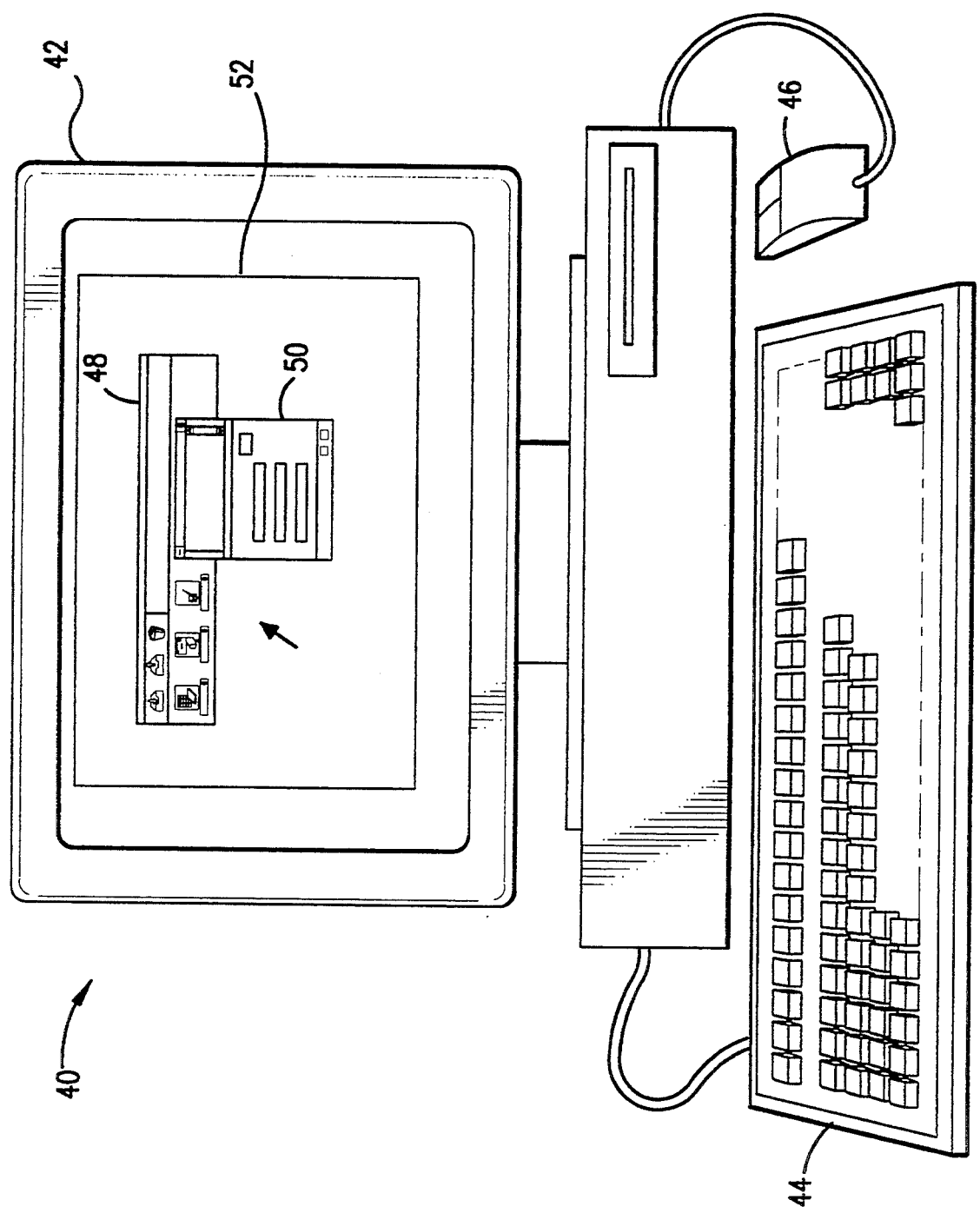
FIG. 3 shows a specific example of a user interface environment in which the present invention operate.

With reference now to FIG. 3, a specific embodiment of the present invention will be described. FIG. 3 shows a computer 40 having a display 42 and input device, in this instance a combination of a keyboard 44 and mouse 46. Display 42 is shown presenting a number of overlapping windows 48, 50, and 52. Underlying all displayed windows is window 52 which is, for example, the graphical user interface provided by the user interface application portion 30 of the OSE 32, such as the desktop window. Displayed over a portion of window 52 is an application windows 48 and a view window 50. Window 48 may be, for example, the user interface to the general office tools application Office 4.0 from WordPerfect Corporation.

Window 50 is a user-defined "view." A user may define a view for virtually any object created by the application. Further, a user may define a view for virtually any object received by the user, regardless of the OSE in which the object was created, provide that the object was created using the appropriate application and view driver. The process of creating a view will first be described, followed by a description of the file structure created in conjunction with the view.

VIEW CREATION

Figure 4:
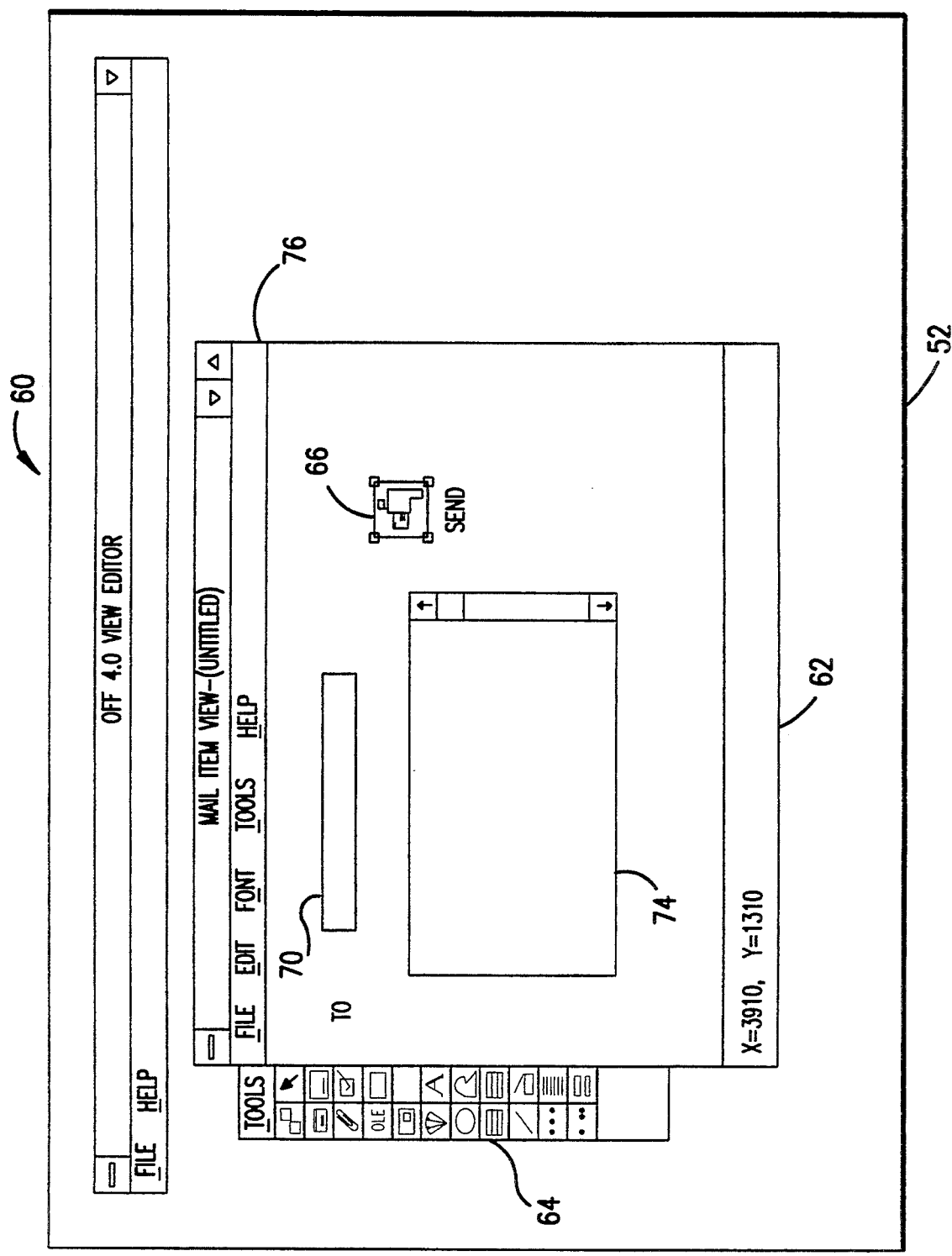
FIG. 4 shows the user interface for the view editor according to one embodiment of the present invention.
Figure 5:
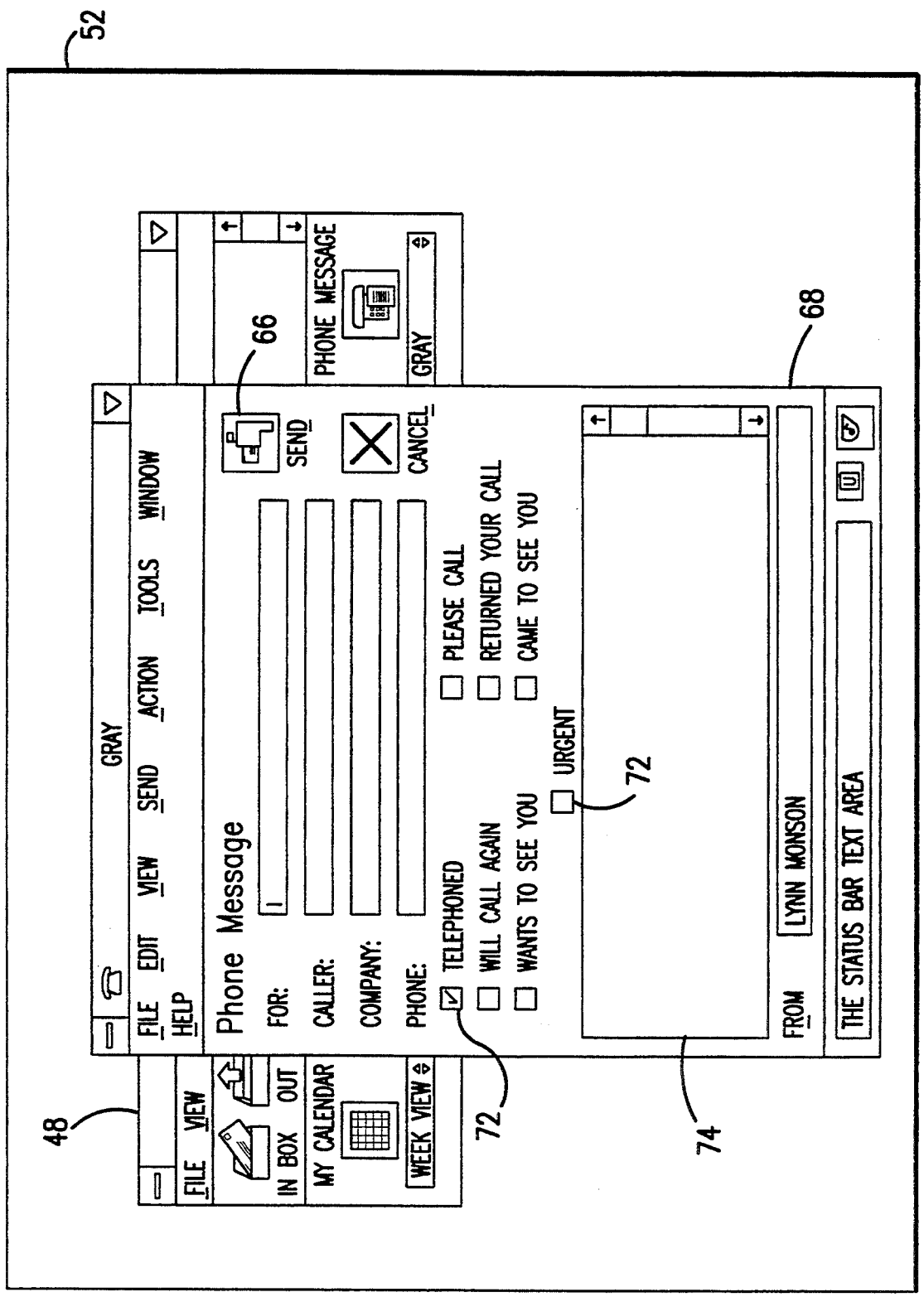
FIG. 5 shows an example of a view created using the view editor of the present invention, in this case a Phone Message view.

With reference to FIG. 4, the first step in creating a view is to open the view editor window 60 representing the user interface to the view driver software 38. The option to open window 60 will be part of the user interface of application software 34, for example an item in a pop up menu (not shown). View editor window 60 comprises two parts: (a) a view blank 62, and (b) a view tools menu 64. A user may select an item from view tools menu 64, and place the item at an arbitrary location within the view blank 62. For example, the user may select a "Send Button" item from the view tools menu 64 by using the mouse 46 to place a pointer over that item and clicking on it. This will cause the system to produce item 66 on the view blank 62 at a location determined by positioning the pointer. The user may manipulate the position of the item by selecting it (again by clicking on it) and dragging the item to any appropriate location on the view blank. A similar process may by used to place virtually any of the view items listed in the view tools menu on view blank 62. A completed view for a Phone Message 68 is shown as an example in FIG. 5.

View tools menu 64 may have listed therein several different types of items, each known in the art. For example, view tools menu 64 may include fields with associated titles for the user to insert data into (such as a "To" item 70 shown in FIG. 4), check boxes (such as the "Telephoned" or "Urgent" boxes 72 shown in FIG. 5), extensible text fields (such as the text field 74 shown in both FIGS. 4 and 5), control buttons (such as the "Send" button 66 shown in both FIGS. 4 and 5), etc. In addition, the view tools menu 64 may include tools for controlling the general layout of the view blank 62. For example, tools may be provided for creating a text object (such as the words "Phone Message" on the phone message view 68 shown in FIG. 5) or a graphic object on the view, as well as tools for controlling the shading, color, line texture or quality, etc. of the view editor window 60 or the items placed on it. Finally, standard pull down menu items may be provided in a pull down menu bar 76 for controlling the functions, features or to provide help information of the view editor as well understood to one skilled in the art.

FILE STRUCTURE

Associated with the creation of the view of an object or application interface is the creation of a view data file having a particular file format which will be associated with the object or interface to facilitate regeneration of the view. This view file specifies information about the object and the controls (i.e., items) in its view. Also specified in the view file may be information about various properties of the view or controls. However, a view file may contain any number of properties, including zero. Therefore, it will not be assumed that some minimum set of properties are always provided in the view file.

Figure 6:
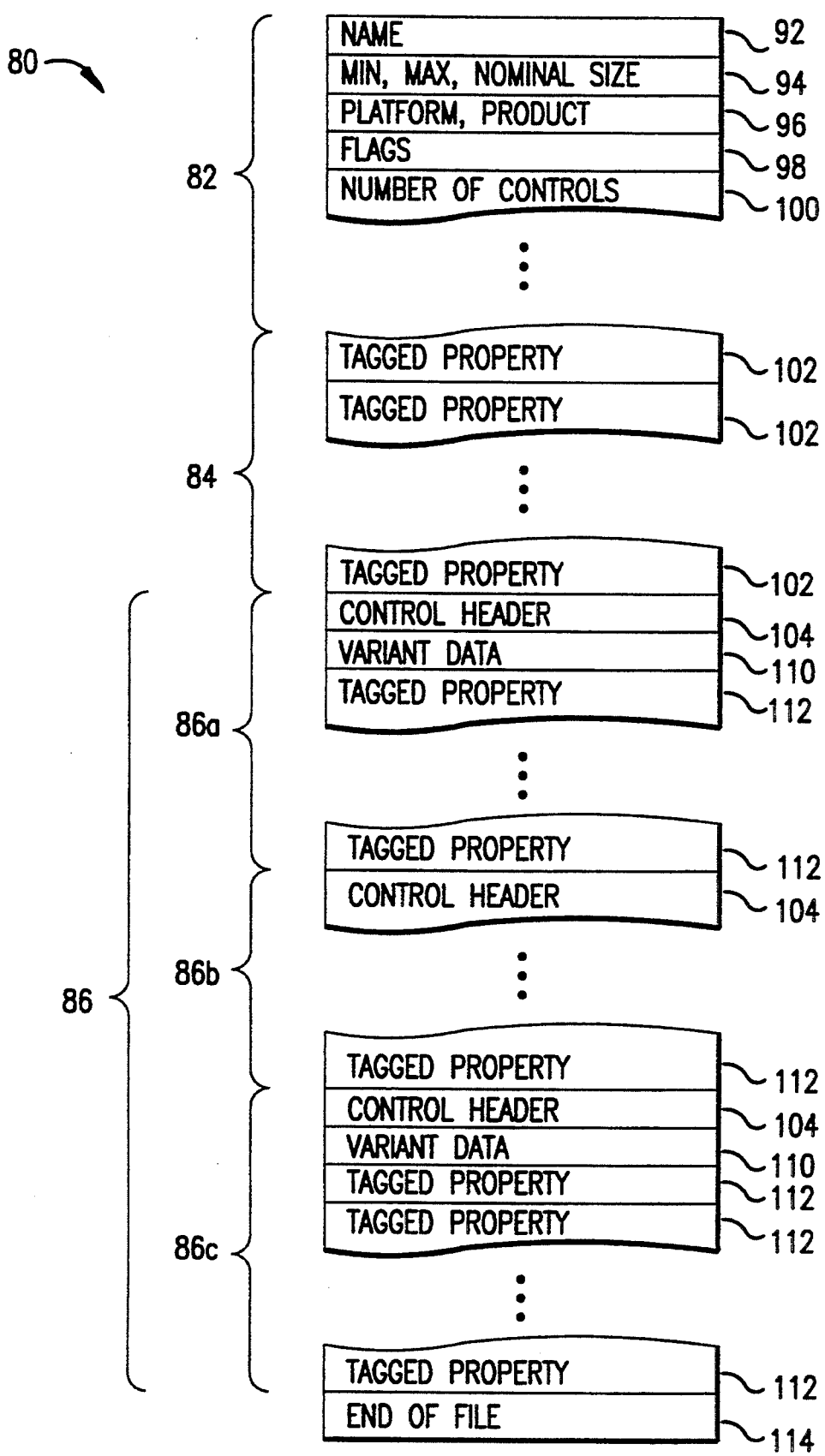
FIG. 6 shows an example of a file format created by the view editor according to one embodiment of the present invention.

Since a view may have different memory configurations from OSE to OSE, an agreed upon file format is defined to facilitate file interchange between machines having different OSEs. In FIG. 6 there is shown the canonical layout and relevant portions of a typical file according to this file format. File structure definitions in the "C" programming language are provided in the view.h file of Appendix A for a number of the items. (In Appendix A, "wp6.0" or "6.0" refers to the word processing application WordPerfect 6.0 ™ from WordPerfect Corporation.)

The canonical format 80 consists of a series of structures including header 82 (_VW_HEADER) which describes the general information about the view, including version, type, originating product, etc., view properties 84 including properties (_VW_TAGGED-PROP) that vary from one view to another, or from one OSE to the next, and control definitions 86, comprised of a plurality of individual control definitions 86a, 86b, 86c, ..., which are similar to a definition of a view in that each control definition includes a header (_VW_CTRL_HEADER), followed by specific control data, followed by one or more tagged properties.

A specific discussion of a number of the various items comprising header structure 82, view properties 84, and control definitions 86 follows. As will be appreciated, the exact contents and order of each structure may vary depending on the application and use of the file format. In addition to those discussed below, Appendix A lists additional items which may be part of the header structure 82, view properties 84, and control definitions 86.

HEADER STRUCTURE 82

Each header structure 82 includes:

Descriptive name 92. This is a descriptive name of the view. For example, this may be the name "phone message" for the phone message 68 shown in FIG. 4. The name may be stored in a format suitable for display to a user (or for identification when examining the file) or simply in a machine identifiable code.

Size designations 94. Included are the minimum, maximum, and nominal size of the area on the users display for the view. That is, this is the size of the window for the view. The size definition is without regard to any adornments or enhancements (such as a pull down menu) provided around the perimeter of the view window.

Platform/product designation 96. This is an identification of the particular platform (OSE) and/or product that the view was created in. By specifying the OSE and/or product that the view was created in, the view may more readily be interpreted and employed across different OSEs and products. As described below, a set of controls will be defined to have a common functionality for a set of OSEs and/or products. If a control is not a member of this set, it will be assigned the control type CT_UNKNOWN. One way to facilitate processing of CT_UNKNOWN controls is to specify in the file the OSE and/or product which created the control (and hence the view). A lookup table or other means for deciphering the control may then be employed if appropriate.

Flags 98. The flags 98 specify certain aspects of the view, such as whether the view is intended to be resizable or not.

Number of View controls 100. This is an integer number indicating how many controls are present in the view file. This is used to assist in scanning and parsing the file.

VIEW PROPERTIES STRUCTURE 84

Each view properties structure 84 includes:

Tagged view properties 102. A tagged property is similar to the well understood tagged file structure. However, tagged properties are part of a file which is at least in part understood within an OSE, and are used to extend the definition of the file. Tagged view properties may or may not be present in the file structure. Views originating from different OSEs will likely differ in the number and/or type of tagged view properties in the view's file structure. Each tagged view property comprises data prefaced by an associated tag. The tag indicates how the associated data should be processed and/or what the associated data is to be used for. For example, the grid layout within a view window may be a tagged view property.

CONTROL DEFINITIONS STRUCTURE 86

Each control definition structure 86 includes:

Control header 104. Control header 104 is of a predefined and commonly understood format for each object. Control header 104 always includes at least one control header tag identifying the control type. As mentioned, a set of controls will be defined across OSEs and products. This allows for direct manipulation by any supported OSE and product of the data to generate the view and the functionality underlying the control in the view. When a control is located in a view, and the file underlying the view is built, the control is identified as a type unknown (CT_UNKNOWN) if it is not a member of the set of controls defined across OSEs and products. The identification of control type will result in a decision about whether the control is one of the predefined commonly understood set of controls or, if not that its a type CT_UNKNOWN control. Thus, the control header tag is machine readable. However, the control header tag may also include data allowing the display of the name of the control to the user. The control header 1 04 will also include data describing the control's size, shape, style, etc., similar to the contents of header structure 82. The control header is referred to as _VW_CTRL_HEADER in the views.h file forming Appendix A.

Variant data 110. Variant data 110 will immediately follow the control header 104 as shown in FIG. 6. The variant data 110 is specific to a particular control. That is, the variant data will be used in the context of the specific control for facilitating the control's use and display.

Tagged control properties 112. As with tagged view properties, tagged control properties may or may not be present in the file structure. Views originating from different OSEs will likely differ in the number and/or type of tagged control properties in the view's file structure. Each tagged control property comprises data prefaced by an associated tag. The tag indicates the nature of the associated data, how it should be processed and- /or what the associated data is to be used for. Tagged control properties 112 are specified by the _VW_TAGGEDPROP structure in the views.h file forming Appendix A.

End of file 114.

An example of a tagged control property is template/instance data, which relate to the contents of an item in a view. For each item view type there is a predefined number and type of items which by necessity must be included. Furthermore, there are a number of items which it may fairly be assumed a user will include in the view. For these two classes of items, specific locations in a data base are set aside as placeholders for the information about and comprising the items. The template/instance data is identified by its tag, and may be employed to fill in the item's contents without need to turn to the data base. In a view where items are placed in the view and filled with data the same way each time the view is used, for example an author may always want to copy himself on mail messages, template data may be employed to short cut the view creation process and obviate the need to refer to the data base. In addition, a user may wish to customize a view by including in it certain items not regularly found in such a view. For example, a user may wish to include bit mapped graphics in a mail message. The contents of items not provided for in the data base structure associated with the view may be contained in the tagged template/instance data for reconstruction of the view. If a view is being opened as received, for example a mail message, the template/instance data specifies instance data. If the view is being opened to create a new view (e.g., a new mail message), the template/instance data specifies template data.

CONTROL DEFINITIONS

Control formats may now be defined for a number of the view controls. These definitions correspond to the views.h file of Appendix A. Only control specific data are present here (header structure data including item parameters, etc., is not included in the following definitions).

CT_ADDR

The CT_ADDR control is the address control used for addressing items. The address control represents a single specific addressing component. The control consists of a _VW_ADDR structure.

CT_ATTACHMENT

This is the area on a view where attachments are shown. The control consists of a _VW_ATTACHMENT structure. Following the _VW_ATTACHMENT structure are a series of application specific word strings indicating a list of attachments to act as template data. This list is terminated by a null (that is, the last string has a double null word at the end).

CT_BOX

A CT_BOX defines a graphic rectangle.

CT_BUTTON

A CT_BUTTON is used for end-user control of a view. The button consists of a _BUTTON_STYLE indication (WUWORD), followed by a definition of the button. For item views, the button definition consists of two components: the definition of the button for item creation and the definition of the button during item reading. For folder views, the button definition consists of a single component. Each button definition component consists of a _VW_BUTTON structure. Data following the _VW_BUTTON structure is defined as follows:

| Button type | Data following _VW_BUTTON |
| --- | --- |
| BTN_TYPE_MACRO | If the button is an internal macro, macro object code follows. If the button is an external macro, the fully qualified path name of the macro follows. |
| All Other Types | No other data. |

If the view is a folder view, a single button definition sequence is placed into the file. If the view is an item view, then two sequences are placed: the first designates the button on the "create side" and the second designates the button on the "read side." CT_BUTTON has no template or instance data. For consistency, buttons may be represented as icons which are of uniform size and shape in each OSE.

CT_CHECKBOX

Consists of a _VW_CHECKBOX structure followed by the name of the checkbox. This control can represent a user defined checkbox or it can reflect a predefined database field.

CT_DATETEXT

This is the control that displays "static" date text on a view. CT_DATETEXT consists of a _VW_DATETEXT structure followed by an application specific date format string.

CT_DAYAPPT

This is the control that displays an appointment in a folder view, and consists of a _VW_DAYAPPT structure.

CT_DAYNOTE

This is the control that displays the notes on a folder view. CT_DAYNOTE consists of a _VW_DAYNOTE structure.

CT_DAYTODO

This is the control that displays the to-do items in a folder view. CT_DAYTODO consists of a _VW_DAYTODO structure.

CT_ENUMERATION

This control is used to select from a set of predefined values on a view. This control can be used to select from data base values or from user defined values. The control consists of a _VW_ENUMERATION structure followed by the string display names of each enumeration value.

CT_FOLDLIST

This is the control that displays a list of folders on a folder view. CT_FOLDLIST consists of a _VW_FOLDLIST structure.

CT_GRAPHIC

A CT_GRAPHIC control consists of a _VW_GRAPHIC string followed by graphical data. The invention as presently embodied requires that the data be in WPG, DRP, or SRO file format. That is, the graphical data byte stream must be directly streamable to a file to produce such a file.

CT_GROUP

This is the object that groups together other objects. CT_GROUP consists of a _VW_GROUP followed by a series of control definitions. The control definitions are defined herein.

CT_INPDATETIME

This is the control used to input dates, times, or auto-date formulas into item views. The control consists of a _VW_INPDATETIME structure followed by a date/time format string.

CT_ITEMLIST

This is the "generic" item list control. CT_ITEM LIST consists of a _VM_ITEM LIST structure.

CT$_{13}$ LINE

This is the control for a line. CT$_{13}$ LINE consists of a _VW_LINE structure.

CT_MONTH

This is the month display data on a folder view. It consists of a _VW_MONTH structure.

CT_MSG

This is the message input area for item views. It consists of a _VW_MSG structure.

CT_OVAL

This control is an oval, and consists of a _VW_OVAL structure.

CT_POLYGON

This is a closed polygon object and consists of a _VW_POLYGON structure followed by a series of WPOINT structures.

CT_ROUNDRECT

This is a rectangle control with rounded corners. It consists of a _VWROUNDRECT structure.

CT_SOUND

A CT_SOUND control consists of a _VW_SOUND structure.

CT_STATICTEXT

A CT_STATICTEXT control consists of a _VW_STATICTEXT structure followed by the static text. In one embodiment of the present invention, the static text is an application specific document string and includes a trailing null byte.

CT_TODOPRIORITY

This control is the to-do priority input area. It consists of a _VW_TODOPRIORITY structure.

CT_UNKNOWN

This control, discussed above, is intended to be used for platform specific controls. The control consists of a _VW_UNKNOWN structure.

According to one embodiment of the present invention, there are a set of controls which can exist on all view types. These controls are:

CT_ENUMERATION, CT$_{13}$ LINE, CT_POLYGON, CT_BOX, CT_OVAL, CT_STATICTEXT, CT_BUTTON, CT_GRAPHIC, CT_GROUP, CT_ROUNDRECT, CT_CHECKBOX, CT_UNKNOWN, CT_GROUP

For the CT_BUTTON, CT_CHECKBOX, and CT_ENUMERATION controls, the user defined variants of these are always available, but depending on view type, the other options may be selected. A full specification of the CT_UNKNOWN is obviously impossible since the list may be added to as new platform specific controls are developed.

Other control types are specific to particular view types. These groupings are as follows:

CONTROLS ON APPOINTMENT VIEWS

CT_ADDR, CT_ATTACHMENT, CT_MSG, CT_SOUND, CT_INPDATETIME

CONTROLS ON FOLDER VIEWS

CT_ITEMLIST, CT_DATETEXT, CT_FOLDLIST, CT_MONTH, CT_DAYAPPT, CT_DAYNOTE, CT_DAYTODO

CONTROLS ON MAIL VIEWS

CT_ADDR, CT_ATTACHMENT, CT_MSG, CT_SOUND

CONTROLS ON NOTE VIEWS

CT_ADDR, CT_ATTACHMENT, CT_MSG, CT_SOUND, CT_INPDATETIME

CONTROLS ON PHONE VIEWS

CT_ADDR, CT_ATTACHMENT, CT_MSG, CT_SOUND

CONTROLS ON TODO VIEWS

CT_ADDR, CT_ATTACHMENT, CT_MSG, CT_SOUND, CT_INPDATETIME, CT_TODOPRIORITY

On each view type there are required controls and optional controls. For those controls that are optional, each OSE user interface may be required to offer alternative methods for inputting data or performing an action. In general, for optional controls that map to data base fields, the user interface is not required to offer any alternative method for inputting the data (although it is possible). For controls that initiate actions, however, the user interface on each platform must offer an alternative method of initiating the action.

There are two exceptions to this. The first is the CT_ENUMERATION control. Since this control can be used to set the priority and security of a message, it is technically in the class of controls that map to data base fields. However, the relationship to user action is strong enough to warrant the requirement on the user interface to provide an alternative method for specifying these values.

The second exception is the CT_ATTACHMENT control. For those view types that support a CT_ATTACHMENT control (which is optional), the user interface must offer an alternative mechanism for manipulating the attachments in the absence of control.

The controls that are required on each view type are as follows:

REQUIRED CONTROLS ON APPOINTMENT VIEWS

CT_INPDATETIME (start/autodate and duration/autodate)

REQUIRED CONTROLS ON FOLDER VIEWS none

REQUIRED CONTROLS ON MAIL VIEWS

CT_ADDR (To)

REQUIRED CONTROLS ON NOTE VIEWS

CT_INPDATETIME (start/autodate)

REQUIRED CONTROLS ON PHONE VIEWS

CT_ADDR (To)

REQUIRED CONTROLS ON TODO VIEWS

CT_INPDATETIME (start/autodate)

USE OF TAGS

It will be appreciated that key to providing a view file for a graphical user interface which is usable in a variety of different OSEs is the provision of tags for both the view and for specific controls. According to the present invention, tags are identifiers understood by applications running in different OSEs which identify a view type, a control type or certain properties, data types, control functions, etc., associated with the tag. Tags may be used to decide which parts of the view file, if any, are capable of being processed by an application.

As explained above, each view type has a predefined minimum set of controls. For a view to be exchangeable between different OSEs, the minimum set must be understood in each OSE. However, each OSE may provide additional controls that a user may wish to include in the view. Certain of these additional controls will be understood only in the OSE in which the view is created, or a limited number of other OSEs, while other controls may be more widely understood.

Figure 7:
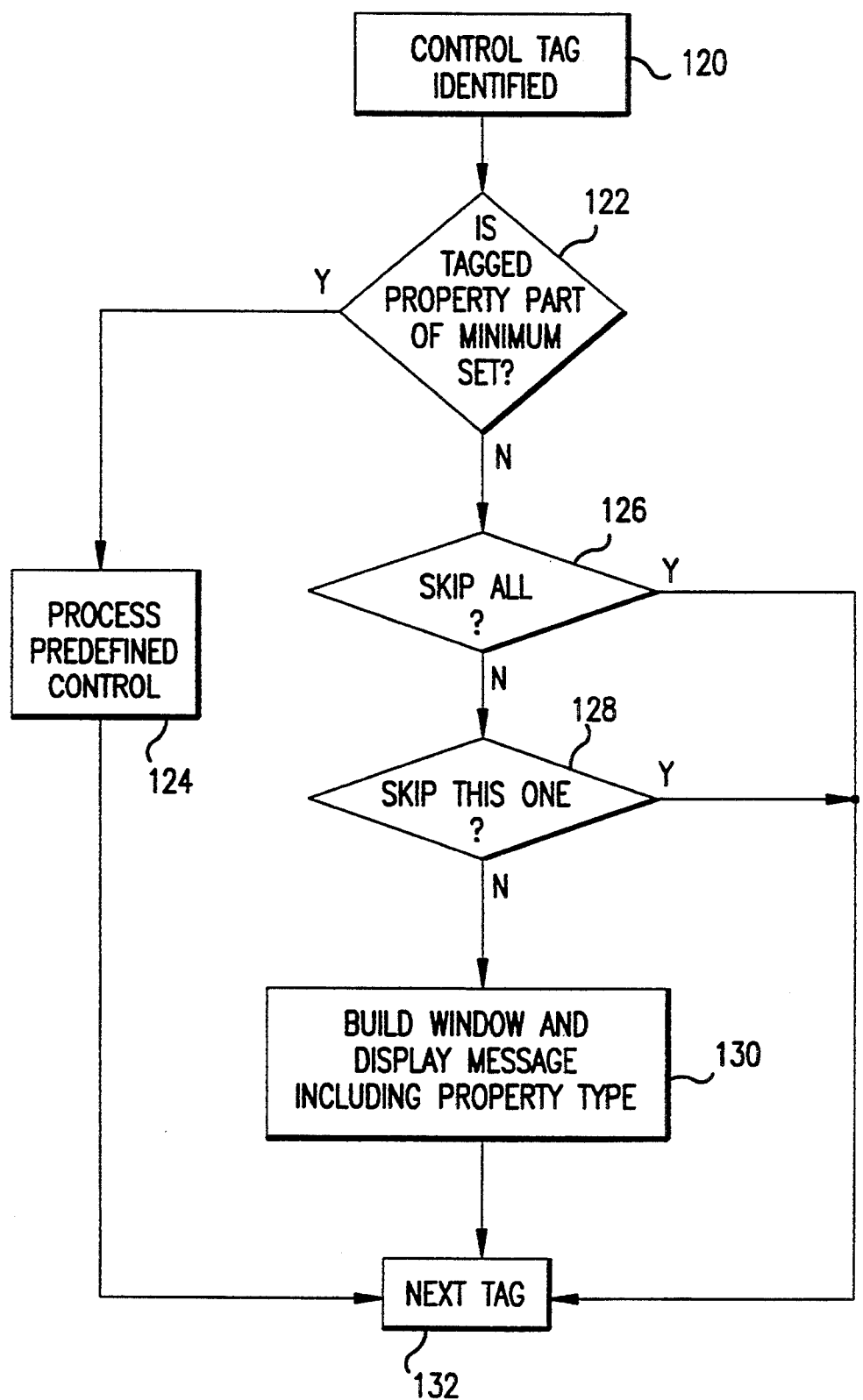
FIG. 7 is a flow chart illustrating the use of tags to facilitate displaying a view from a view file created in an arbitrary OSE.

How the tags facilitate use of a view file for a graphical user interface in a variety of different OSEs will be explained with reference to FIG. 7. Each control is identified by a tag. The first step 120 illustrated in FIG. 7 is to locate and identify the control tag. The next step is to determine whether the tag is a member of the minimum set of tags which are common to all OSEs. This determination is shown at step 122. If the control is a member of the minimum set, the control may be processed as appropriate to that OSE, as shown at step 124. When a control is provided which, based on its tag, is not understood in the particular OSE (i.e., CT_UNKNOWN) the control may be skipped (or, of course, a system may attempt to decipher the unknown control, and if successful may employ that control as if it were a member of the minimum set). The application may skip all such controls, as shown at step 126, or may make a decision to skip certain controls, while handling certain others, as shown at step 128.

Each control header contains code capable of generating human readable information about the control, for instance the name of the control, and information about the size, location, shape, etc. of the control's window. If a decision is made to handle a control which is not understood by the application, a minimum amount of processing is still possible based on the information provided in the control's header. For example, an application may build a window in the view of the object it is creating from the object's view file and insert in the window a test string identifying the name of the control which would appear in the window and that it is not able to display the contents of the window. This is shown at step 130 in FIG. 7.

This methodology provides several advantages. First, this avoids system errors caused by attempting to fully process a control which the application is not capable of processing. Second, the functionality of that control is still provided when the view is processed by an application in an OSE which can understand the control. That is, extensible view files may be provided which remain usable in all OSEs while allowing an arbitrary number of OSE specific controls (even those specific to various different OSEs) to be made a part of the control. Third, even if the control is not one which can be fully processed by the application, there is sufficient information in the view file to allow an indication to be generated that a control has been encountered of a particular type which could not be fully processed.

The above description has focused on the case of a view file containing objects beyond the minimum set for the particular view type (i.e., extensible view files). However, a view file may be provided for a particular view type (identified by its view tag) with less than all properties for specifying the view (since a view file may include any number of properties, including zero). This situation is handled by allowing an application to fill in the missing required properties from its own definition of the view type. For example, assume in a first OSE an application must establish a grid underlying a window in order to place items on that window. Assume also that the application running on a second OSE does not provide such a grid as part of its view file. When the application in the first OSE scans the view file produced in the second OSE it notes the absence of the grid property, and generates the property on its own, just as if it had been located in the view file as produced in the second OSE. Since as for properties a file can never be "incomplete," system errors caused by attempting to process incomplete view files are avoided, and further allows for the use of such files virtually as if they had included additional properties as received. Thus, another advantage provided is the ability of an application to use a default properties when processing a received view file when the application does not find a property required for the view type being processed.

STANDARD AND CUSTOM VIEWS

Another aspect of the present invention relating to the view file is the ability to transmit an object between OSEs without transferring an entire view file relating to that object. This speeds transmission, reduces the possibility of transmission errors, and facilitates a system administrator's ability to specify certain preferred views for objects.

When an object is created using a "standard" view, only an identification of that view, as opposed to a complete description of the view, need be transmitted with the object data file. These views are referred to as standard since they are predefined, and commonly understood in various OSEs. When an object is created or sent its object data file will contain an indication of which standard view the object was created in. When an application builds a view of a received standard object, the application uses its own definition of the identified standard view together with the object data file.

When a message is received it is scanned for "attachments," which are links or other elements associating the object data file with a view file. The view represented by the file which the application looks for is called a "custom" view, and details of its construction and use are given above. If after scanning no attached view file is located, the application will assume the view is a standard one, and will examine the object data file for the view definition.

Standard views may be constructed and/or distributed with an application by a system administrator. If it is desired that users create objects using only standard views, the system administrator may limit the distribution of the tools necessary to create custom views.

In addition, a receiving application can be programmed to display an object in only a selected standard view. For example, when an object is created in a non graphical user interface based OSE, such as DOS, the object may be assigned a standard view for display by an application in a graphical user interface based OSE. This may also be used to constrain a view for all objects of a particular type which are received, such as inclusion of a proprietary information statement in all received internal memorandum objects, etc.

OSE INDEPENDENCE

The described implementation is on an IBM PC or compatible PC running the DOS operating system and the Microsoft Windows 3.1 application. However, it will be appreciate that the present invention may be implemented in virtually any OSE and on virtually any hardware, including other PCs, workstations or other electronic devices. Furthermore, the present invention has been described in terms of a specific application and a view driver, each being disclosed as separate entities. However, it will also be appreciated that the present invention may be implemented as an integral part of another program, typically a scheduling and/or calendar and/or mail program such as Office 4.0 from WordPerfect Corp.

In general to those skilled in the art to which this invention relates, many changes in construction and widely differing embodiments and applications will suggest themselves without departing from the spirit and scope of the present invention. For example, views have been discussed above in terms of a visual appearance. However, sounds or other means of perception may be customized in a fashion similar to that described above, employing a similar file structure to that disclosed herein. Thus, the above description, including the figures and embodiments described, are exemplary, and should not be taken to limit the scope of the present invention, which will be appreciate from the claims as follows.

APPENDIX A

```
* A view may have different memory configurations from platform to platform.
* However, to facilitate platform interchange, an agreed upon file and
* transport format needs to be defined.  This canonical format consists
* of a series of structures as follows:
*
*       Structure name           Description
*       ===============          ============
*       _FF_VIEWHEADER           "generic" information about the view that
*                                indicates view origin (including
platform),
*                                view size, view type, etc.
*
*       VIEWPROPERTY             A definition of a view property.  There
*                                can be zero or more of these items.
*
*       VIEWCONTROL              A definition of a control on a view.
There
*                                can be zero or more of these items.
*================================================================*/ typedef struct __VW_HEADER {
    WUWORD          wHeaderVersion;      /* VIEWHEADER version number */
    WUWORD          wProductID;          /* designates the originating product */
    WUWORD          wPlatformID;         /* designates the originating platform */

/*================================================================
 * NOTE: potentially, everything from this point forward can vary from
 * platform to platform, although this is NOT preferable.
 *================================================================*/

/* Misc. view data */
    WUDWORD         dwSize;              /* total size of view definition (in
bytes) */
    WUWORD          wViewType;           /* view type */

/* WP 6.0 word string - name of the view */
    WUBYTE          wszName[VNAME_LEN];

/* size specifications for the view */
    WSWORD          wNomWidth;           /* nominal view width (1200ths of an
inch) */
```

```
        WSWORD          wNomHeight;         /* nominal view height (1200ths of an
inch) */
        WSWORD          wMaxWidth;          /* Maximum view width (1200ths of an
inch) */
        WSWORD          wMaxHeight;         /* Maximum view height (1200ths of an
inch) */
        WSWORD          wMinWidth;          /* Minimum view width (1200ths of an
inch) */
        WSWORD          wMinHeight;         /* Minimum view height (1200ths of an
inch) */

/* view color */
    _VW_COLOR   sViewColor;         /* RGB value for view color (background) */

/* view flags (32 bit flags) */
    WUDWORD     dwFlags;            /* bit flags */

/* property information */
    WUWORD      wNumProps;          /* number of properties attached to view
*/

/* control information */
    WUWORD      wNumControls;       /* number of controls on the view */

/* reserved data */
    WUDWORD     dwRes1;             /* reserved - must Be 0 */
    WUDWORD     dwRes2;             /* reserved - must be 0 */

} _VW_HEADER;

typedef struct __VW_TAGGEDPROP {
    WUWORD      wPropSize;          /* total byte size of the property */

/*
     * property tag -- these must be unique across all properties.
     */
    WUDWORD     dwPropId;

/*
     * variant property data follows: it is interpreted by the
     * creator of this property.
     */
} _VW_TAGGEDPROP;
/*
    Platform ranges:
    0 - 99      Reserved
    100-199     Windows
    200-299     Macintosh
    300-399     OS/2
    400-499     DOS
*/

/* Constants for view header version #s */
#define VIEW_HEADER_VER00       0x000B      /* viewheader version 0.0 */
                                            /* These will be bumped
                                             * during development, but
should
                                             * be fixed at some value when
                                             * we release.
                                             */

/* Platform Identifiers */
#define VIEW_DOS                1           /* MS-DOS based view */
#define VIEW_WINDOWS            2           /* MS-Windows based view */
#define VIEW_MAC                3           /* Macintosh based view */
#define VIEW_OS2                4           /* OS/2 based view */

/* Product Identifiers */
#define PROD_OFFICE             1           /* Office view */

/* View types -- supported by all products */
#define VT_NONE                 0
```

```c
/* View types -- specific to PROD_OFFICE */
#define VT_FOLDER            1       /* folder view */
#define VT_MAILITEM          2       /* mail item view */
#define VT_SCHEDITEM         3       /* a schedules item view */
#define VT_TODOITEM          4       /* a TODO item view */
#define VT_NOTEITEM          5       /* a NOTE item view */
#define VT_PHONEITEM         6       /* a phone message view */
#define     VT_INBOX         7       /* an inbox folder view */
#define     VT_OUTBOX        8       /* an outbox folder view */
#define     VT_TRASH         9       /* a wastebasket view */

/* bit flags */
#define VF_FIXEDSIZE         1       /* view can not be sized */
#define VF_TEXT              2       /* view is text based -
necessary? */
#define    VF_PERSONAL       4       /* personal item view */

/* list of all registered properties IDs */ typedef struct _VWRECT {
    WSWORD          left;
    WSWORD          top;
    WSWORD          right;
    WSWORD          bottom;
} VWRECT;

typedef struct _VWPOINT {
    WSWORD          x;
    WSWORD          y;
} VWPOINT;

/* file format structure definition of a control */
typedef struct _VW_CTRL_HEADER {
    WUWORD          wCtrlType;       /* control type */
    WUDWORD         dwCtrlSize;      /* control size - total # bytes */
    WUDWORD         dwFlags;         /* control flags */
    VWRECT          rcPosition;      /* position of the item in WPUs */

/* line drawing context */
    _VW_COLOR sLineBkgRGB;
    _VW_COLOR sLineFgdRGB;
    WUWORD          bLineWidth;
    WUWORD          bLineStyle;
    WUWORD          wLineFillStle;
    /* fill context */
    _VW_COLOR sFillBkgRGB;
    _VW_COLOR sFillFgdRGB;
    WUWORD          wFillStyle;

/* number of properties following the header */
    WUWORD     wNumProps;

/* reserved data -- must be 0 */
    WUDWORD         dwRes1;          /* reserved */
    WUDWORD         dwRes2;          /* reserved */
} _VW_CTRL_HEADER;

/* Control types -- supported by all products */
#define CT_NONE              0
#define CT_LINE              1
#define CT_BOX               2
#define CT_OVAL              3
#define CT_STATICTEXT        4
#define CT_ITEMLIST          5
#define    CT_SOUND          6
#define CT_ADDR              7
#define    CT_BUTTON         8
#define CT_MSG               9
#define    CT_GRAPHIC        10
#define    CT_DATETEXT       11
#define CT_FOLDLIST          12
#define    CT_ATTACHMENT     13
#define CT_MONTH             14
#define CT_INPDATETIME       15
#define CT_DAYAPPT           16
#define CT_DAYNOTE           17
#define CT_DAYTODO           18
```

```
#define   CT_GROUP                19
#define CT_INBOXLIST              20
#define   CT_OUTBOXLIST           21
#define   CT_CHECKBOX                  22
#define   CT_ENUMERATION          23
#define CT_ROUNDRECT              24
#define CT_POLYGON                25
#define CT_TODOPRIORITY           26
#define CT_CALWEEK                27
#define   CT_UNKNOWN                   255

/* Control flags */
#define CF_FONTSEL                1    /* control responds to fonts */
#define CF_HASPROPS               2    /* control has a properties dlg*/
#define CF_FIXEDSIZE              4    /* control can not be sized! */
#define   CF_ANNOTATION           8    /* control is not part of the view */
define   CF_HIDDEN               16   /* control is hidden except in editor */ define LABEL_SIZE       66    /* 32 word chars + NULL */

/*=============================================================
 * Definitions related to CT_ADDR
 *=============================================================*/

/*
 *
 *
 *
 *
 *
 */ typedef enum {
    ADDR_TO=1,                    /* The to/people/resources line */
    ADDR_FROM,                    /* The from line */
    ADDR_SUBJ,                    /* The subject line */
    ADDR_CC,                   /* The CC line */
    ADDR_BC,                   /* The BC line */
    ADDR_AUTHORITY,               /* The authority line */
    ADDR_PLACE,                   /* The place line */
    ADDR_NAME,                    /* Phone message caller name */
    ADDR_COMPANY,              /* Phone message company name */
    ADDR_PHONE                    /* Phone message phone number */
} _ADDR_STYLE;

typedef enum {
    ADDR_TRANSPARENT = 0x0001,    /* The control is transparent */
    ADDR_NOLABEL     = 0x0002,    /* The control has no label */
    ADDR_LEFTJUSTIFY = 0x0004,    /* The label is left justified (w/pad) */
    ADDR_RIGHTJUSTIFY= 0x0008     /* The label is right justified (w/pad) */
} _ADDR_FLAGS;

typedef struct _VW_ADDR {
    VW_FONTDESC   fnt;        /* display font */
    _ADDR_STYLE   wstyle;     /* address style */
    _ADDR_FLAGS   fFlags;     /* display flags */
    WUWORD        wLen;       /* length of inst/tmpl data (null
included)*/

/*=============================================================
 * Constants related to CT_ATTACHMENT
 *=============================================================*/
/* Attachment styles (bit fields) */
typedef enum {
    ATTACH_ICONIC_HORIZONTAL,
    ATTACH_ICONIC_VERTICAL
} _ATTACH_STYLE;

typedef struct _VW_ATTACHMENT {
    VW_FONTDESC   fnt;        /* display font for text */
    _ATTACH_STYLE wstyle;          /* display type */
    WUWORD        wNumTemplates; /* # of template attachments */
} _VW_ATTACHMENT;

/*
 * Following the _VW_ATTACHMENT struct is a series of WP 6.0 word strings
 * as template data for the attachments. The format for this data is
```

```
* as follows:
*
*       WUWORD          (length of string including trailing null word)
*       WUWORD [] (array of characters (null terminated) )
*
*       ...
*
*       WUWORD  0 (length of zero indicating no more data)
*/

/*===========================================================================
 * Definitions related to CT_BOX
 *===========================================================================*/

/*===========================================================================
 * Definitions related to CT_BUTTON
 *===========================================================================*/
typedef enum {
    BTN_TYPE_ACCEPT=0,
    BTN_TYPE_ATTACH,
    BTN_TYPE_CANCEL,
    BTN_TYPE_CURDAY,
    BTN_TYPE_DELEGATE,
    BTN_TYPE_DELETE,
    BTN_TYPE_FORWARD,
    BTN_TYPE_HIDDEN,
    BTN_TYPE_INFO,
    BTN_TYPE_MACRO,
    BTN_TYPE_OK,        /* for personal items */
    BTN_TYPE_PRINT,
    BTN_TYPE_REJECT,    /* same as delete ??!! */
    BTN_TYPE_REPLY,
    BTN_TYPE_BUSYSRCH,
    BTN_TYPE_SAVE,
    BTN_TYPE_SEND,
    BTN_TYPE_USERS
} _BUTTON_TYPE;

typedef enum {
    BTN_TEXT=0,
    BTN_GRAPHIC,
} _BUTTON_STYLE;

typedef struct __VW_BUTTON {
    _VW_FONTDESC     fnt;               /* font for the text */
    _BUTTON_STYLE    wStyle;            /* style of button */
    _BUTTON_TYPE     wSAction;          /* btn type on send side */
    WUWORD           wSFlags;           /* type specific styles */
    WUBYTE           wszSLabel[LABEL_SIZE];/* label on send side - wp
6.0 word string */
    _BUTTON_TYPE     wRAction;          /* btn type on recv side */
    WUWORD           wRFlags;           /* type specific styles */
    WUBYTE           wszRLabel[LABEL_SIZE];/* label on recv side - wp
6.0 word string */
} _VW_BUTTON;

/*
 * wTypeStyle flags for BTN_TYPE_CURDAY
 */
#define  DM_BTN_DIRECTION    1
#define  DM_BTN_FORWARD      0
define  DM_BTN_BACKWARD     1 define  DM_BTN_MAGNATUDE    6
define  DM_BTN_DAY          0
#define  DM_BTN_WEEK         2
#define  DM_BTN_MONTH        4
#define  DM_BTN_YEAR         6

/*
 * wTypeStyle flags for BTN_TYPE_MACRO
 */
#define  MAC_BTN_ON_DISK     0
#define  MAC_BTN_INTERNAL    1

/*
 * if wType is BTN_TYPE_MACRO, the macro data follows the button name.
```

```
* for MAC_BTN_INTERNAL, the object code follows, otherwise it is the
* platform specific file name of the macro.
*/

/*==========================================================================
 * Constants related to CT_CHECKBOX
 *==========================================================================*/

/*
 *
 *
 *
 *
 */
define __VW_LABEL_SZ          64 typedef struct __VW_CHECKBOX {
    _VW_FONTDESC    fnt;              /* display font */
    WUDWORD         wCheckBoxField;                /* check box field */
    WUDWORD         wCheckedValue;    /* bits to set on checked */
    WSWORD          iState;                        /* instance/templ. state */
                                      /* -1 - default - - from
setup information */
                                                   /*   0 - off */
                                                   /*   1 - on  */

WUWORD          wLen;                          /* text length */

/* checkbox label -- wp6.0 word string (null terminated) */
    WUBYTE          wszLabel[ __VW_LABEL_SZ ];
} _VW_CHECKBOX;

/*
 * wCheckBoxField is one of the following values:
 *
 *      zero                            - user defined.
 *      PHONE                           - phone field.
 *
 * For non user-defined checkboxes, the value of wCheckedValue is OR'd
 * into the database field designated by wCheckBoxField.
 */

/*==========================================================================
 * Constants related to CT_DATETEXT
 *==========================================================================*/
/* styles for the DateText control */
#define DTX_SYSTEM         0x0000       /* display system date */
define DTX_VIEWED         0x0001       /* display cursor date */ define DTX_AUTOABRV       0x0002       /* automatically abbreviate */ define DTX_LEFT           0x0000       /* left justify */
define DTX_HCENTER        0x0010       /* horizontally center */
define DTX_RIGHT          0x0020       /* right justify */ define DTX_TOP            0x0000       /* top justify */
define DTX_VCENTER        0x0040       /* vertically center */
define DTX_BOTTOM         0x0080       /* bottom justify */ define DATE_FMT_MAX       128          /* maximum format length */ typedef struct __VW_DATETEXT {
    _VW_FONTDESC    fnt;              /* font for the text */
    WUWORD          wStyle;           /* bit flags */
    WUWORD          wLen;             /* format length (including
null) */

/* date text format string follows -- WP 6.0 document string */
    WUBYTE          wszFormat[ DATE_FMT_MAX ];
} _VW_DATETEXT;

/*==========================================================================
 * Definitions related to CT_DAYAPPT
 *==========================================================================*/
typedef enum {
    APPT_GRAPHIC=0,
    APPT_TEXTUAL
} APPT_TYPE;
```

```
typedef struct __VW_DAYAPPT {
    VW_FONTDESC    fnt;          /* display font */
    APPT_TYPE      wType;        /* display type */
} _VW_DAYAPPT;

/*========================================================
 * Definitions related to CT_DAYNOTE
 *========================================================*/
typedef struct __VW_DAYNOTE {
    VW_FONTDESC    fnt;          /* display font */
} _VW_DAYNOTE;

/*========================================================
 * Definitions related to CT_DAYTODO
 *========================================================*/
typedef enum {
    TODO_DUEDATE_SRT=0,
    TODO_PRIORITY_SRT
} TODO_SORT_TYPE;

typedef struct __VW_DAYTODO {
    VW_FONTDESC     fnt;             /* display font */
    TODO_SORT_TYPE  wDefSort;        /* default sorting order */
} _VW_DAYTODO;

/*========================================================
 * Definitions related to CT_CALWEEK
 *========================================================*/
typedef struct __VW_CALWEEK {
    VW_FONTDESC    fnt;          /* display font */
    WUWORD         vColumns;     /* number of column */
} _VW_CALWEEK;

/*========================================================
 * Constants related to CT_ENUMERATION
 *========================================================*/

/*
 *
 *
 *
 *
 */ typedef struct __VW_ENUMERATION {
    VW_FONTDESC    fnt;              /* display font */
    WUWORD         wNumOptions;      /* # of potential values */
    WUDWORD        dwEnumField;      /* Enumeration field */
    WSWORD         iState;           /* template/instance data */
                                     /*  -1 - default */
                                     /*   otherwise option # */
} _VW_ENUMERATION;

/*
 * wEnumType is one of the following values:
 *
 *      zero                 - user defined
 *      SENDER_PRIORITY      - priority of the message.  This implies that
 *                             the wNumOptions field is 3.
 *      SECURITY             - security level of the message.  This implies
 *                             that the wNumOptions field is 6.
 *
 */ define ENUM_LBL_MAX        64
typedef struct __VW_ENUM_VALUE {
    /* the name is a WP 6.0 word string */
    WUBYTE             wszName[ ENUM_LBL_MAX ];
    WUDWORD            dwEnumValue;
} _VW_ENUM_VALUE;

/*
 * dwEnumValue is the field value stored into dwEnumField for the
 * particular enumeration value.  For user defined enumerations,
 * dwEnumValue is undefined.
 */

/*========================================================
 * Constants related to CT_FOLDLIST
 *========================================================*/
```

```c
typedef struct __VW_FOLDLIST {
    _VW_FONTDESC    fnt;            /* font for the control */
} _VW_FOLDLIST;
```

/*==================================================
 * Constants related to CT_GRAPHIC
 *==================================================*/

```c
typedef struct __VW_GRAPHIC {
    WUDWORD         dwWpgLen;       /* # bytes of graphic data that follow */
    WUWORD          wAVFileType;    /* animation file type */
    WUWORD          wAVFileNameLen; /* length of the animation file name */
    WUWORD          wInitDelay;     /* initial display delay (in milliseconds) */
    WUWORD          wRepDelay;      /* display repeat delay (in milliseconds) */
    WSWORD          iRepeatFactor;  /* -1 = one frame, 0 = forever, # frames */
    VWRECT          rcNomSize;      /* nominal display size. */

/* WPG data follows */
    /* Animation file name follows -- wp 6.0 word string */
} _VW_GRAPHIC;
```

/*
 * Common values for wAVFileType are:
 *
 *    0      no animation is present -- WPG data only
 *    505    CV_RIFFMMP -- multimedia movie
 *    517    Quicktime -- this value may change!
 *    518    AVI movie -- this value may change!
 *    495    DRP presentation
 *    519    DRQ presentation -- this value may change!
 *
 * All platforms should include WPG data following the _VW_GRAPHIC object.
 * Note, however, that this is not required and receiving platforms should
 * check for a size of zero in the dwWpgLen field.
 */

/*==================================================
 * Definitions related to CT_GROUP
 *==================================================*/

```c
typedef struct __VW_GROUP {
    WUWORD          wNumCtrls;      /* # of controls in the group */
} _VW_GROUP;
```

/*==================================================
 * Definitions related to CT_INPDATETIME
 *==================================================*/

```c
typedef enum {
    INP_AUTODATE=0,
    INP_STARTDATE,
    INP_ENDDATE,
    INP_DURATION
} _INP_TYPE;

typedef enum {
    INP_TRANSPARENT   = 0x0001,     /* Text is transparent */
    INP_SWAPPABLE     = 0x0002,     /* can be swapped at run time */
    INP_NOLABEL       = 0x0004,     /* The control has no label */
    INP_LEFTJUSTIFY   = 0x0008,     /* The label is left justified (w/pad) */
    INP_RIGHTJUSTIFY  = 0x0010      /* The label is right justified (w/pad) */
} _INP_STYLE;

typedef struct __VW_INPDATETIME {
    _VW_FONTDESC    fnt;
    _INP_TYPE       wType;          /* input type */
    _INP_STYLE      wStyle;         /* input style */
    WUWORD          wLen;           /* date format length (incl. null) */
    /* date format string follows -- wp6.0 word string */
} _VW_INPDATETIME;
```

/*==================================================
 * Definitions related to CT_ITEMLIST
 *==================================================*/

```
typedef struct __VW_ITEMLIST {
    VW_FONTDESC     fnt;            /* font used for display */
    WUDWORD         dwItemTypes;    /* db item types bit field */
    WUDWORD         dwBoxTypes;     /* db box types bit field */
} _VW_ITEMLIST;

/*
 * dwItemTypes can be any combination of the following:
 *
 *   ITEM_TYPE_APPT
 *   ITEM_TYPE_MAIL
 *   ITEM_TYPE_NOTE
 *   ITEM_TYPE_TODO
 */

/*
 * dwBoxTypes can be any combination of the following:
 *
 *   BOX_TYPE_IN
 *   BOX_TYPE_OUT
 *   BOX_TYPE_PERSONAL
 */

/*=====================================================
 * Definitions related to CT_LINE
 *=====================================================*/
typedef struct __VW_LINE {
    VWPOINT         ptStart;        /* coords are in WPUs */
    VWPOINT         ptEnd;
} _VW_LINE;

/*=====================================================
 * Definitions related to CT_MONTH
 *=====================================================*/
typedef enum {
    MONTH_ANCHOR=0,
    MONTH_RELATIVE
} MONTH_DISP_TYPE;

typedef struct __VW_MONTH {
    VW_FONTDESC     fnt;            /* font used for display */
    MONTH_DISP_TYPE wDispType;      /* display type */
    WSWORD          iDispValue;     /* display value (based on wDispType) */
} _VW_MONTH;

/*
 *
 *
 *
 *
 *
 */

/*
 * wDispValue is one of the following:
 *
 * For wDispType==MONTH_RELATIVE, wDispValue is an offset from -12 to 12
 *
 * For wDispType==MONTH_ANCHOR, wDispValue is a value from 0-11
 */
/*=====================================================
 * Definitions related to CT_MSG
 *=====================================================*/
typedef struct __VW_MSG {
    VW_FONTDESC     fnt;            /* font used for display */
    WUWORD          wLen;           /* length of template data */

/* template data follows -- wp 6.0 document string */
} _VW_MSG;
/*=====================================================
 * Definitions related to CT_OVAL
 *=====================================================*/
/*=====================================================
 * Definitions related to CT_POLYGON
 *=====================================================*/
typedef struct __VW_POLYGON {
    WUWORD          wNumPoints;     /* number of points in the polygon
```

```
*/
        /* VWPOINT structs follow -- coords are WPUs */
} _VW_POLYGON;
/*===========================================================
 * Definitions related to CT_ROUNDRECT
 *===========================================================*/
typedef struct __VW_ROUNDRECT {
    WUWORD        wHorzAxis;         /* width of horizontal axis (wpus)
*/
    WUWORD        wVertAxis;         /* height of horizontal axis (wpus)
*/
} _VW_ROUNDRECT;
/*===========================================================
 * Definitions related to CT_SOUND
 *===========================================================*/
#define SOUND_DESC_MAX      64
typedef struct __VW_SOUND {
    WUWORD        wNameLen;          /* length of description string */

/* descriptive name */
    WUBYTE        wszDesc[ SOUND_DESC_MAX ];
} _VW_SOUND;
/*===========================================================
 * Definitions related to CT_STATICTEXT
 *===========================================================*/
#define STATIC_MAX      128
typedef struct __VW_STATICTEXT {
    _VW_FONTDESC    fnt;            /* display font */
    WUWORD          wLen;           /* length of the text including
null */

/* the static text itself -- wp 6.0 document string */
    WUBYTE          dszText[ STATIC_MAX ];
} _VW_STATICTEXT;
/*===========================================================
 * Definitions related to CT_TODOPRIORITY
 *===========================================================*/
typedef enum {
    PRIOR_TRANSPARENT = 0x0001,     /* text box is transparent */
    PRIOR_NOLABEL     = 0x0002      /* input area is not labeled */
} _TODOCAT_STYLE;

typedef struct __VW_TODOPRIORITY {
    _VW_FONTDESC    fnt;            /* display font */
    _TODOCAT_STYLE  wStyle;         /* todo category input area style */
} _VW_TODOPRIORITY;
/*===========================================================
 * Definitions related to CT_UNKNOWN
 *===========================================================*/
define UNKNOWN_NAME_MAX    128 typedef struct __VW_UNKNOWN {
    /* object name -- wp 6.0 word string */
    WUBYTE          wszDispName[ UNKNOWN_NAME_MAX ];

/* registered object ID */
    WUWORD          wUnknownID;

/* size of the variant data */
    WUDWORD         dwVarSize;

/* variant data follows */
} _VW_UNKNOWN;

/* All registered CT_UNKNOWN data types are listed here */
#define   CT_UNKNOWN_OLE          1
define CT_UNKNOWN_QUICKTIME     2 endif
```

What is claimed is:

1. A digital computer for presenting a view of an object, said digital computer operating in a first operating system environment, said object represented by object data and said view represented by view data associated with said object data, said object being one of several types of objects and including a control defined by control data forming a part of said view data, said view data created in a second operating system environment different from said first operating system environment, and said control being of the type which may or may not be recognizable by the digital computer, said digital computer comprising:

a display device;

an input device for providing input signals from a user;

a data storage memory device storing said object data and said view data, said stored view data including a tag identifying said control, and further including data for associating said object data and said view data;

a processor device, connected to said display device, said input device, and said data storage memory device, for receiving said input signals from the user enabling accessing of said view data, for determining based on said tag identifying said control whether said control is recognizable by said processor device or not, and for providing output signals to said display device in accordance with said input signals such that a view of said object according to said view data is displayed thereon and further such that if said control is determined to be recognizable said view is displayed so as to include said control thereon, and if said control is determined to be not recognizable said view is displayed without said control thereon; and wherein said object's type is defined to include at least one property which may or may not be specified in said view data, said data storage memory device further including a default specification for said property, said view data further including a tag identifying said object's type, and said processor device further for identifying said object's type based on said tag identifying said object, for determining said object's at least one property from said object type, and for displaying said view in accordance with said object's at least one property as specified in said view data if said property is specified by said view data and otherwise displaying said view in accordance with said default specification of said property as stored in said data storage memory device.

2. A digital computer for presenting a view of an object, said digital computer operating in a first operating system environment, said object represented by object data and said view represented by view data associated with said object data, said object being one of several types of objects and including a control defined by control data forming a part of said view data, said view data created in a second operating system environment different from said first operating system environment, said control being of the type which may or may not be recognizable by the digital computer, and said control data defining an operation, graphically represented in said view by said control, which may be performed on said object data to transform said object data from a first state to a second state different than said first state when said control is selected by a user, said digital computer comprising:

a display device;

an input device for providing input signals from said user;

a data storage memory device storing said object data and said view data, said stored view data including a tag identifying said control, and further including data for associating said object data and said view data;

a processor device, connected to said display device, said input device, and said data storage memory device, for receiving said input signals from said user enabling accessing of said view data, for determining based on said tag identifying said control whether said control is recognizable by said processor device or not, and for providing output signals to said display device in accordance with said input signals such that a view of said object according to said view data is displayed thereon and further such that if said control is determined to be recognizable said view is displayed so as to include said control thereon, and if said control is determined to be not recognizable said view is displayed without said control thereon.

3. A digital computer for presenting a view of an object, said digital computer operating in a first operating system environment, said object represented by object data and said view represented by view data associated with said object data, said object being one of several types of objects and including a control defined by control data forming a part of said view data, said view data created in a second operating system environment different from said first operating system environment, and said control being of the type which may or may not be recognizable by the digital computer, said digital computer comprising:

a display device;

an input device for providing input signals from a user;

a data storage memory device storing said object data and said view data, said stored view data including a tag identifying said control, and further including data for associating said object data and said view data;

a processor device, connected to said display device, said input device, and said data storage memory device, for receiving said input signals from the user enabling accessing of said view data, for determining based on said tag identifying said control whether said control is recognizable by said processor device or not, and for providing output signals to said display device in accordance with said input signals such that a view of said object according to said view data is displayed thereon and further such that if said control is determined to be recognizable said view is displayed so as to include said control thereon, and if said control is determined to be not recognizable said view is displayed without said control thereon; and wherein said control is of the type which has a control name, and further of the type which may be displayed in a control window in said view, said control data stored in said data storage memory device including control name data of the type which may be recognized by said processor device and used by said processor device to cause said name of said control to be displayed in said view, and further including control window parameter data recognizable by said processor device defining at least the size of said control window, said processor device further for providing output signals to said display device such that if said control is determined not to be recognizable, said control window is displayed in said view having at least said control name displayed therein in accordance with said control name data and said control window data.

4. A digital computer for presenting a view of an object, said digital computer operating in a first operating system environment and communicationally connected to a second digital computer operating in a second operating system environment different from said first operating system environment, said object represented by object data and said view represented by view data associated with said object data, said object being one of several types of objects and including a control defined by control data forming a part of said view data, said view data created in said second operating system environment and communicated to said digital computer from said second digital computer, and said control being of the type which may or may not be recognizable by the digital computer, said digital computer comprising:

- a display device;
- an input device for providing input signals from a user;
- a data storage memory device storing said object data and said view data, said stored view data including a tag identifying said control, and further including data for associating said object data and said view data;
- a processor device, connected to said display device, said input device, and said data storage memory device, for receiving said input signals from the user enabling accessing of said view data, for determining based on said tag identifying said control whether said control is recognizable by said processor device or not, and for providing output signals to said display device in accordance with said input signals such that a view of said object according to said view data is displayed thereon and further such that if said control is determined to be recognizable said view is displayed so as to include said control thereon, and if said control is determined to be not recognizable said view is displayed without said control thereon.

5. In a networked computer system having at least two different graphical user interface operating system environments communicationally connected so as to be able to exchange files therebetween, a data storage memory device containing a file structure representing a view of one of a plurality of types of objects created in a first of said two different graphical user interface operating system environments and viewable in a second of said two different graphical user interface operating system environments, said view being displayable in a window in said second operating system environment, said file structure comprising:

- a file header structure including data recognizable in said second operating system environment identifying said first operating system environment in which said file structure was created and object tag data also recognizable in said second operating system environment identifying the type of said object;
- a file control structure including control tag data recognizable in said second operating system environment, said control tag data including the identity of a control, and control data defining at least an image of said control for display in said view which may or may not be recognizable in said second operating system environment, said control data further defining an operation, graphically represented in said view by said image of said control, which may be performed on said object to transform said object from a first state to a second state different than said first state when said control is selected by a user; and
- wherein said view window is displayed so as to include said control thereon if, based on the identity of said control determined from said control tag data, said control is recognizable in said second operating system environment, and otherwise wherein said view window is displayed without said control thereon.

* * * * *